(12) United States Patent
LeMay

(10) Patent No.: US 6,352,401 B1
(45) Date of Patent: Mar. 5, 2002

(54) CARRIER FOR A MOTORCYCLE

(76) Inventor: Richard P. LeMay, 3601 Hill Ave., No. 73, Toledo, OH (US) 43607

( * ) Notice: Subject to any disclaimer, the term of this patent is extended or adjusted under 35 U.S.C. 154(b) by 0 days.

(21) Appl. No.: 09/372,374

(22) Filed: Aug. 11, 1999

(51) Int. Cl.$^7$ .............................................. B62D 43/00
(52) U.S. Cl. ....................... 414/463; 414/466; 280/402
(58) Field of Search ................... 414/462, 463, 414/466; 280/402

(56) References Cited

U.S. PATENT DOCUMENTS

| | | | | |
|---|---|---|---|---|
| 5,011,361 A | * | 4/1991 | Peterson | 414/462 |
| 5,145,308 A | * | 9/1992 | Vaughn et al. | 414/462 |
| 5,366,338 A | * | 11/1994 | Mortensen | 414/462 |
| 5,560,628 A | * | 10/1996 | Horn | 280/402 |
| 5,620,197 A | * | 4/1997 | Howes | 414/462 |
| 5,674,044 A | * | 10/1997 | Ranes | 414/462 |
| 5,697,629 A | * | 12/1997 | Guild | 414/462 |
| 5,984,613 A | * | 11/1999 | Motilewa | 414/462 |
| 6,099,012 A | * | 8/2000 | Mortimer | 414/462 |

* cited by examiner

Primary Examiner—Robert P. Olszewski
Assistant Examiner—Steven B McAllister

(57) ABSTRACT

The invention herein is a carrier apparatus structured to be attached to a motor vehicle for carrying motorcycles and similar vehicles, which carrier is adapted for external attachment to a motor vehicle for supporting and carrying motorcycles in an upright position externally to said motor vehicle, with such apparatus having three major subcomponents, specifically, a base support member, referred to as a main support member, which is rigidly affixed to a portion of the vehicle through a connecting elevating mechanism, with the base support member having a bottom wheel support member to hold a portion of the front wheel of the carried motorcycle, and a vertical support portion, with an elevating member adapted to raise or lower the wheel base member.

2 Claims, 4 Drawing Sheets

US 6,352,401 B1

CARRIER FOR A MOTORCYCLE

This application is Filed Pursuant to a Provisional Patent Application Serial No. 60-096350 filed Aug. 13, 1999.

BACKGROUND OF DISCUSSION AND DISCUSSION OF PRIOR ART

The subject invention relates to the type of carriers that are adapted for external connection to a portion of a vehicle with the connected carrier adapted to transport various objects therein, particularly two wheeled vehicles such as bicycles or motorcycles. The general area to which this invention relates thus falls within a group of such carrier devices. The invention herein incorporates a significant development over existing carriers that are used to hold motorcycles or similar vehicles in an upright position at the posterior portion of the motor vehicle for transporting such vehicles.

Vehicular carriers that are generally appended to the rear portion of a motor vehicle are usually adapted to transport such vehicles in a secure and safe manner, with ease of removal of the vehicle carried. As stated, there are a wide variety of external carriers adapted for transporting motorcycles. An overview of such existing vehicular carriers indicates that there are relatively few that incorporate into one compact and manageable structural apparatus the integrated features of portability, ease of handling, relative compactness of components, and ease of operation, along with secure holding and carrying features. A limited number of such carriers possess features that include, to any significant degree, a combination of the foregoing features. Moreover, no known such devices possess the structural capability of being easily lowered down to the ground level to facilitate the loading or unloading of the motorcycle and then raised above the ground level to a sufficient distance for transporting the motorcycle or other vehicle. Thus, the apparatus herein is a carrier which is conceived and adapted to address all of the foregoing problems and deficiencies that prevail with existing carriers.

In this latter respect, it is to be noted and stressed that the subject apparatus is adapted mainly as a carrier for appendage to the rear part of a vehicle. Side or front carriers are not frequently used in the transport of small vehicles such as bicycles and such carriers cannot be widely used for motorcycles because of the width and size of motorcycles. Consequently, such vehicles must be generally towed, and the rear part of a vehicle is the only feasible place to attach such a carrier. Consequently, the invention herein is focused on carriers that are generally appended to the rear portion of a motor vehicle, although the scope of the invention is not to be so limited.

Several other problems are usually encountered with the structural aspects of existing motorcycle carriers adapted for disposition on the rear of a motor vehicle. One such aspect is that the construction of existing motorcycle carriers involve complex, intricately integrated parts which lead to expensive manufacturing conditions. Other problems with existing motorcycle carriers, that are adapted for connection to the posterior of a vehicle as stated above, are seen in the lack of relative portability of such devices and ease of handling for persons with limited physical capacity or mobility. The subject invention is conceived additionally to overcome these variant problems in order to provide an improved motorcycle carrier for appendage to the rear exterior portion of a motor vehicle for ease of handling. The following objects of the subject invention are directed in view of the above considerations accordingly.

SUMMARY OF THE INVENTION

By reason of the foregoing, the following are objects of the subject invention:

An object of the subject invention is to provide a versatile external motorcycle carrier for small vehicles;

It is an object of the invention to provide a motorcycle carrier for attachment to a motor vehicle;

It is an object of the subject invention to provide an improved motorcycle carrier for attachment to a standard motor vehicle;

Another object of the subject invention is to provide a multipurpose carrier that is easily loaded or unloaded;

Yet another object of the subject invention is to provide a motorcycle carrier that is easy to operate and otherwise utilize;

Yet another object of the subject invention is to provide a motorcycle carrier which minimizes physical lifting requirements;

Still another object of the subject invention is to provide a carrier which is easily affixed to the rear of a motor vehicle;

A further object of the subject invention is to provide an improved carrier for small vehicles that does not require extrinsic holding means in order to keep the carrier in place;

Another object of the subject invention is to provide a carrier for small two wheeled vehicles which is relatively compact;

It is an object of this invention to provide an improved object carrier or external attachment to a land vehicle;

Other and further objects of the subject invention will become apparent from a reading of the following description taken in conjunction with the claims and drawings.

DESCRIPTION OF GENERAL EMBODIMENT

Figure 1:
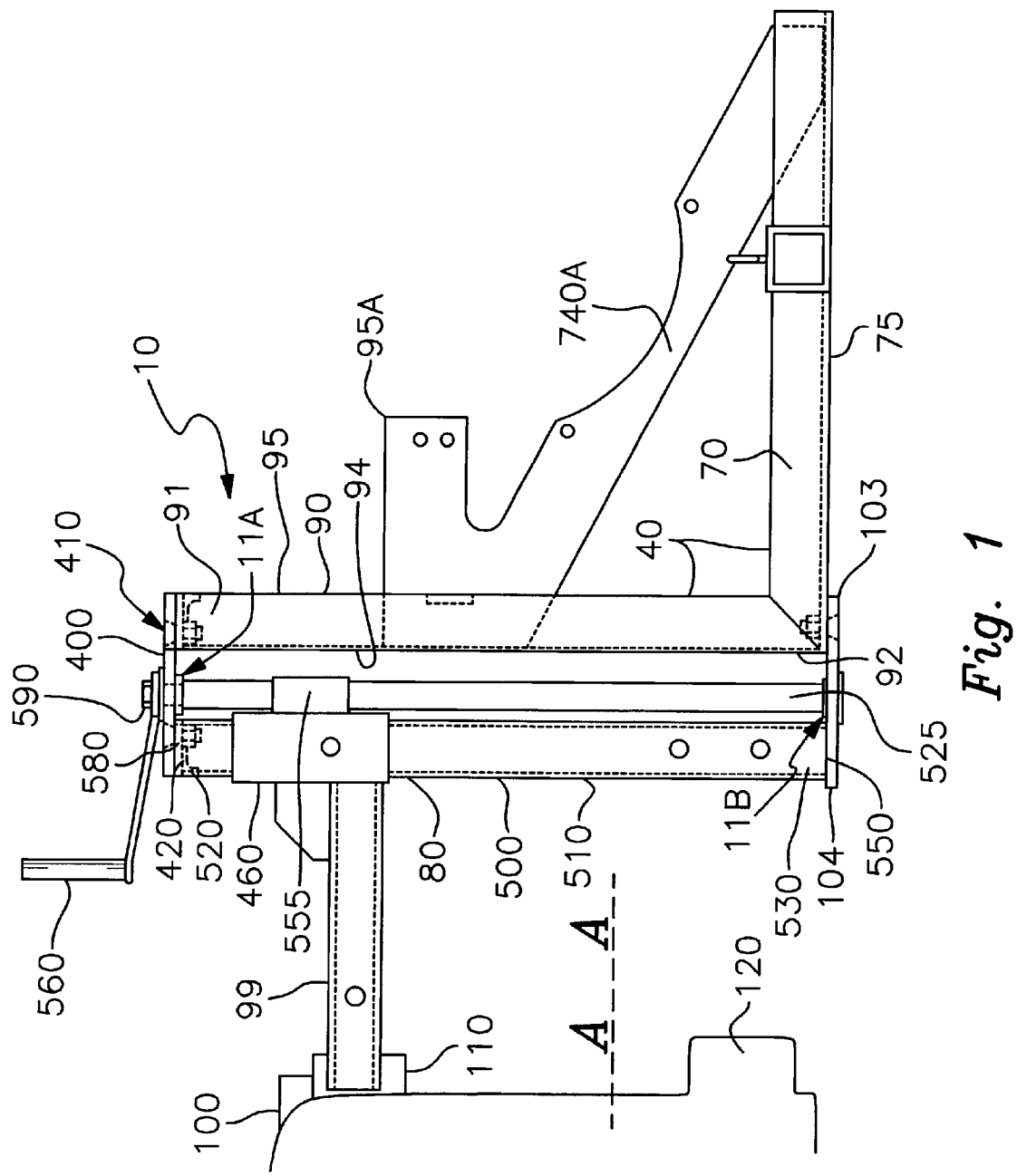
FIG. 1 is a side elevational view of a preferred embodiment of the subject invention, shown disposed at the rear of the vehicle to which the subject carrier is attached.

The invention herein is a carrier apparatus structured to be attached to a motor vehicle for carrying motorcycles and similar vehicles, which carrier is adapted for external attachment to a motor vehicle for supporting and carrying motorcycles in an upright position externally to said motor vehicle, with such apparatus having three major subcomponents, specifically, a base support member, referred to as a main support member, which is rigidly affixed to a portion of the vehicle through a connecting elevating mechanism, with the base support member having a bottom wheel support member to hold a portion of the front wheel of the carried motorcycle, and a vertical support portion, with an elevating member adapted to raise or lower the wheel base member.

In the larger perspective, the subject invention is a vehicle carrier incorporated in a device comprised of a base support and connecting member rigidly attached to a hitch member on the towing vehicle, so as to project the carrier in a longitudinal manner from the rear of the towing vehicle a given distance away from the rear portion of the towing vehicle. However, the carrier can be appended in some integral fashion to other portions of the towing vehicle to which it is affixed. Irrespective of whether the carrier is affixed to the rear of other portion of the towing vehicle, it has a base support member, that is rigidly affixed to a connecting member affixed to the towing vehicle. This base support member extends rearwardly from the rear portion of the towing vehicle so as to effect a rigidly projecting upright member. The significant aspect about this base support member is that it should be rigidly affixed to the towing vehicle in some manner so as to be secured from a longitudinal, vertical, or lateral perspective relative to the towing vehicle. The base support member has a rearwardly protruding horizontal platform member that is adapted to hold the front wheel of a two wheeled vehicle and further has vertical elevating means to raise or lower the horizontal platform as necessary for safe towing or loading of the towed vehicle.

The horizontal platform member, as stated, in a horizontal member adapted to hold a portion of the front wheel of the towed vehicle in a position so that the rear wheel of the towed vehicle rides above the ground.

The carrier is additionally equipped with locking means to lock the front wheel of the towed vehicle on the carrier when towed, along with the stated lifting means to elevate the platform member to elevate such platform member when the towed vehicle is placed in the towing position. Specific elements and aspects of the subject invention will be set forth in the following description of a preferred embodiment of the such invention.

DESCRIPTION OF PREFERRED EMBODIMENT

The description below of a preferred embodiment of the subject invention will be a description of only one potential embodiment considered to be within the scope of the subject invention. Consequently, a description of such a preferred embodiment of the subject invention will not be considered as limiting the scope of the invention as set forth in the claims annexed hereto.

It is further to be stressed that in describing the preferred embodiment of the subject invention, the following described definitions, reference points, and reference axes will be utilized. Since the preferred embodiment of the subject invention is a carrier device for connection to the rear of a vehicle, the word "frontal" will be used in reference to the front area of a vehicle, while the words "posterior" or "rear" will be used relative to direction disposed toward the rear of such a vehicle and generally extending towards a rearward direction from such vehicle. The words "longitudinal central axis" will refer to that axis which extends through the center, as seen in cross-section, of an object from the one end to the other end thereof over its longest extend; or alternately stated, from one extreme point to the most distal point on such object. The work "longitudinal" or "longitudinally extending" shall mean a direction extending more generally lengthwise in a given direction than otherwise. The word "transverse" will mean the lateral or width distance over a given object, which will be considered generally perpendicular to the longitudinal central axis of such object. The work "upper" will refer to distances extending above and away from the ground and the word "lower" will refer to those areas extending toward the ground reference. In this latter respect, the ground reference will be considered level or horizontal. Whenever the words "left" or "right" are used in the following description, they will be used, unless otherwise stated, in reference to any orientation of the left and right hand when one faces the carrier from a position posterior to the vehicle to which the carrier is connected.

Figure 2:
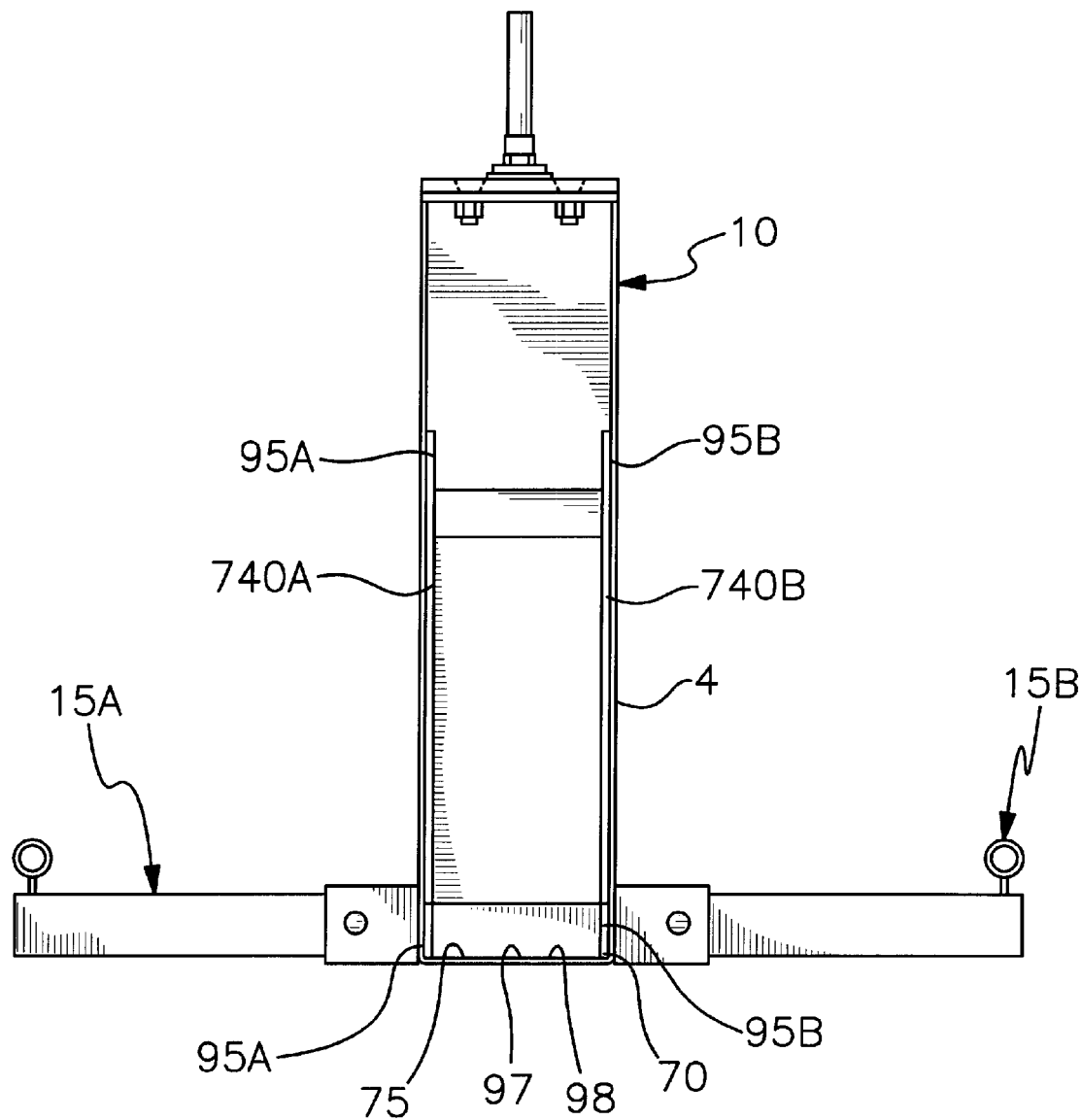
FIG. 2 is a rear elevational view of the subject invention, shown from the posterior of the vehicle looking forward, as being appended to the rear of a vehicle.

Attention is now focused particularly to FIGS. 1 and 2 of the drawings in which a preferred embodiment of the subject invention is shown as a carrier device 10, incorporating the features of the subject invention. The carrier device 10 is adapted particularly as a carrier for a small tandem two-wheel vehicle for towing attachment to the posterior portion of a towing motor vehicle 100 through a rearwardly projecting, rigidly attached connecting member 110 of the type generally used to connect and hitch conventional trailers. It is noted that the carrier apparatus 10 can be attached directly to other parts of the motor vehicle 100, such as a rear bumper 120, or other suitable fixed objects on the towing motor vehicle 100 with appropriate attachment fixtures.

Figure 3:
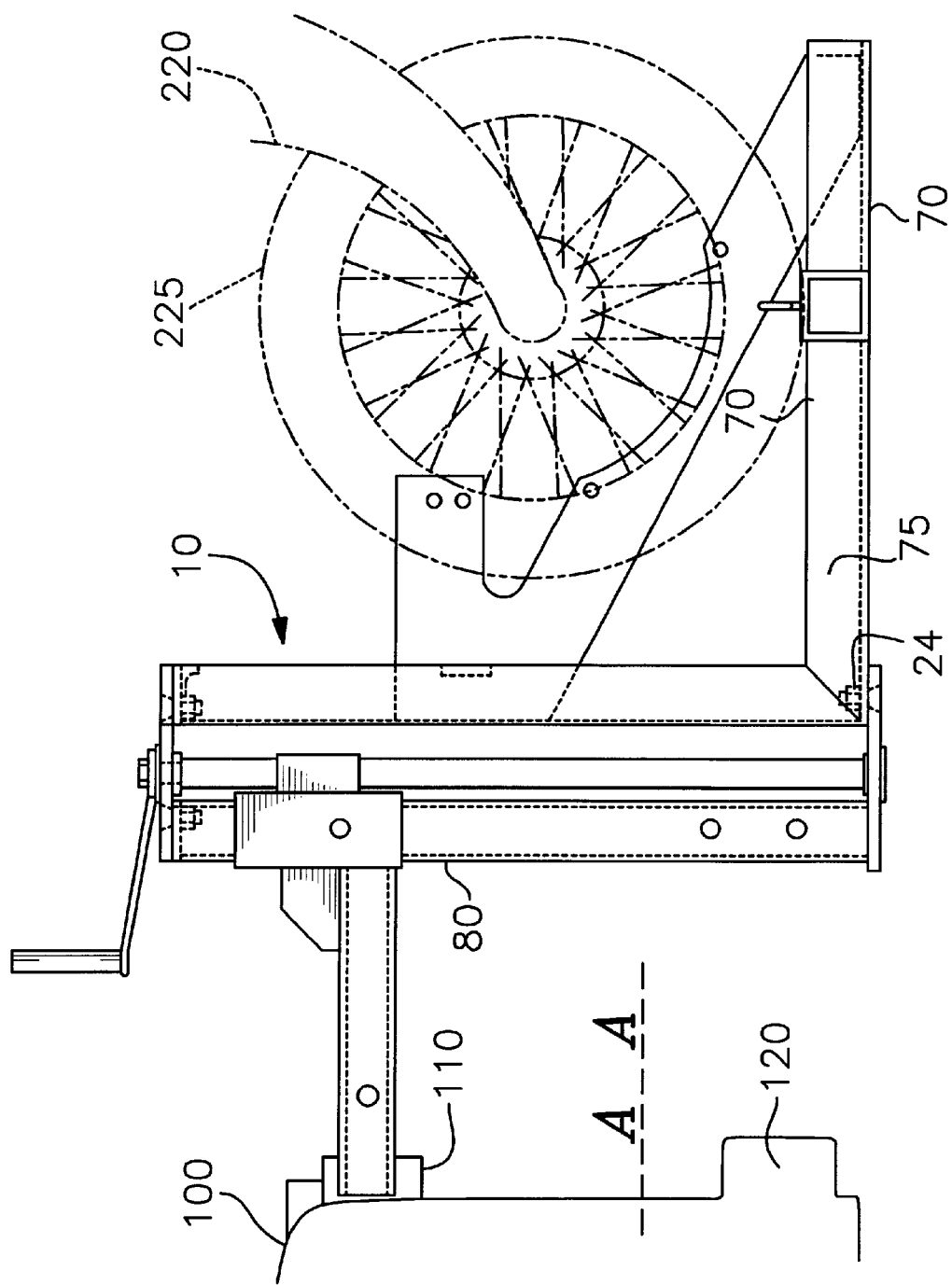
FIG. 3 is a side elevational view of the subject invention, showing the placement of a motorcycle therein.
Figure 4:
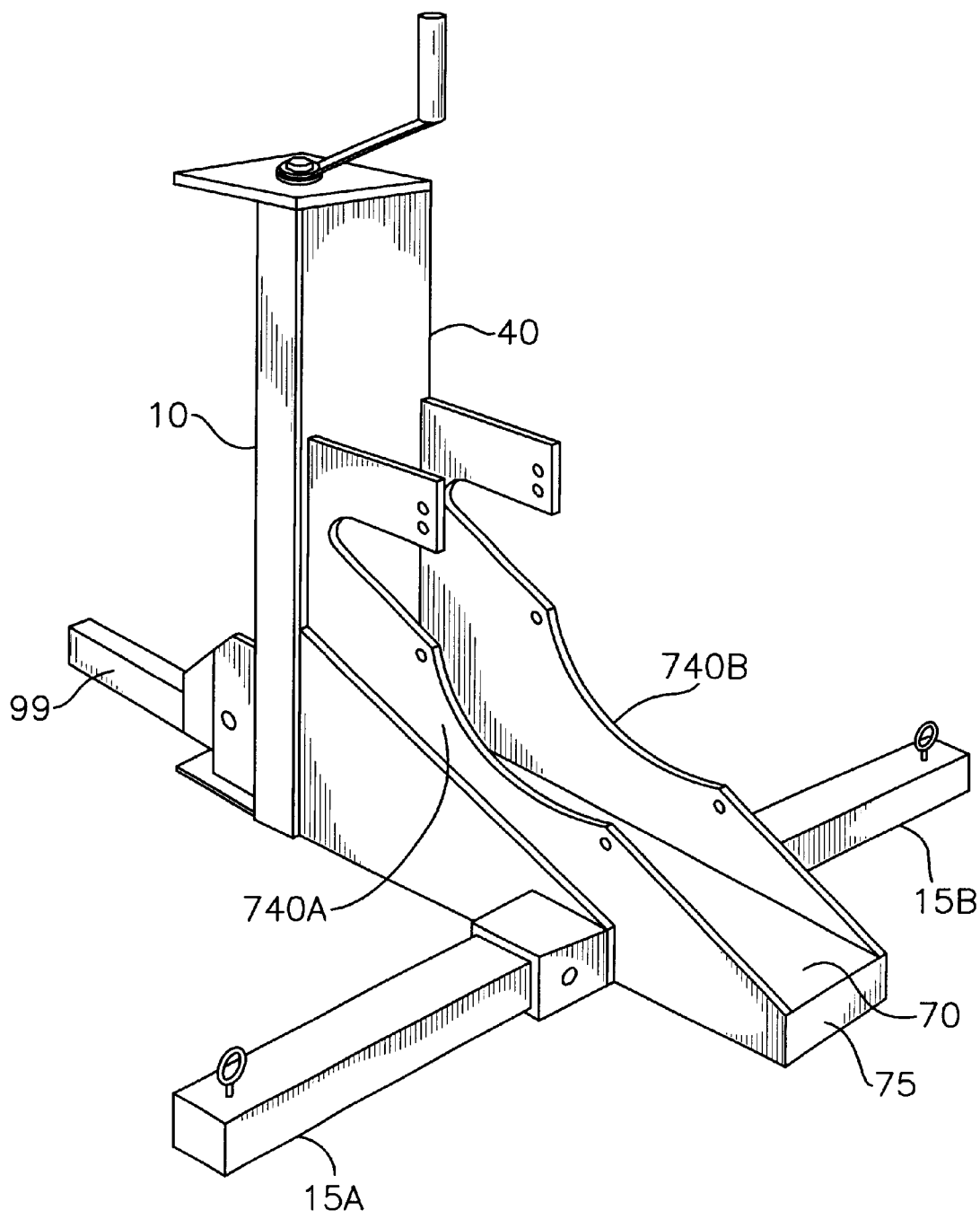
FIG. 4 is a perspective view of a subject device incorporating features of the subject invention.

As seen and stated, the carrier device 10 particularly described herein and shown in the drawings is particularly adapted for carrying a small two-wheeled tandem vehicle, such as a motorcycle 220, having a front wheel 225 and a back wheel, not shown, as partially represented in FIG. 3. It must be stressed, however, that the physical apparatus of this carrier apparatus can be used for various other types of small vehicles, not shown or described, and the inventive apparatus herein is not specifically limited to two wheeled vehicles only. Also, as stated above, the carrier device 10 herein can be conceivably used on the front of any vehicle under some circumstances. However, for the purpose of describing the specific embodiment and application, the carrier device 10 is described as being generally and preferably appended to the rear portion of a motor vehicle 100 as shown in the drawings, as the most feasible location and disposition thereof, with application of the embodiment described herein particularly directed to a two-wheeled scooter or motorcycle 220, as discussed above.

Generally, the carrier device 10 incorporating features of the subject invention is comprised of six subcomponents. In particular, carrier device 10 has a rigidly affixed upright base support member 40, a wheel carrying platform member 75, having a wheel holding platform 70, an elevating mechanism 80, lateral support arm members 15A and 15B which arm members are adapted to help hold and stabilize the carrier 10, and the carried motorcycle 220, and a connecting member 99. The specific details of the structure and operation of these subcomponents will be specifically described herein below.

As can be seen from the drawings, the base support member 40 is basically an L-shaped member as seen from a side elevational view, as seen from a side elevational view, comprising vertically upright rigid beam member 90 having an upper portion 91 and a lower portion 92. Moreover, the upright beam member 90 has a front vertical surface 94 and a posterior vertical surface 95. Rigidly affixed to the lower portion 92 of the posterior surface 90 of the rigid beam member 90 is horizontal channeled beam wheel carrying member 75, forming the lower horizontal leg of the L-shaped base support member 40. As can be seen, the wheel carrying member 75 has channeled side edges 95A and 95B forming a channel 97 between such side edges and the upper surface 98 of the wheel carrying member 75. It is to be stressed that the base support member 40 can be other than an L-shaped member as described above.

As can be seen from the drawings, the wheel carrying member 75 extends posteriosly from the motor vehicle 100 and the carrier 10 in a longitudinally extending manner with its longitudinal central axis being aligned parallel to the longitudinal, front-to-rear, central axis of the vehicle 100, although this precise described alignment is not critical to the subject invention.

In the embodiment shown in the drawings, the base support member 40 is secured to the towing vehicle 100 through attachment member 99. Attachment member 99 is a longitudinally extending member adapted to be coaxially aligned with a corresponding trailer hitch member 110 integrally disposed on the posterior portion of towing vehicle 100 as shown. Attachment member 99 is mounted on the frontal portion of the base support member 40, and particularly on the sleeve portion 460 of the elevating mechanism 80 on base support member 40, as more fully described below. The connecting member 99 is a rigid member that remains fixed in its vertical disposition above the ground level and relative to the hitch member 110 to the rear portion of motor vehicle. As stated the forward part of the rigid horizontal connecting member is affixed on its frontal end to sleeve member 460, which also remains fixed at the same vertical level as the connecting member. Thus, when the elevating mechanism 80 is raised or lowered through the hand crank 560 the base support member 40 will move up and down within the vertical limits of the elevating mechanism as more fully described below.

Specifically, integrally affixed to the frontal portion of the vertical support beam 90 is vertically elevating mechanism 80. This vertical elevating mechanism 80 functions to elevate and lower, as needed, the entire base support member 40 relative to the ground level. More specifically, since the connecting member 99 is rigidly affixed in position directly or indirectly to the motor vehicle 100, the elevating mechanism 80 functions to raise or lower the entire base support member 40. The particularized structural arrangement of the lifting mechanism is structured as follows in the preferred embodiment of the subject invention.

Attention is addressed again to FIG. 1 of the drawings. In FIG. 1 as seen, the structural mounting of the connecting member 99 is a fixed member, attached to the posterior surface of sleeve member 460 of the elevating mechanism. In this latter respect, the sleeve member 460 has an internal hollow chamber open at both the upper and lower ends of such sleeve member so that the internal hollow chamber extends completely through the sleeve member. For this purpose, the internal chamber of the sleeve member 460 is preferably, but not necessarily of an internal surface configuration that is basically the same configuration as the outer external perimeter or circumferential surface of the vertical support member 510 for the elevating member 80. In the preferred embodiment, this configuration of the internal chamber is rectangular as seen from an upper or lower elevational view to be compatible with the rectangular configuration of the outer surface of the vertical support member 510. However, the perimeter dimension will be just a slightly larger perimeter dimension than that of the external surface of the lift support member 510. This latter size relationship will enable the vertical lift support member 510 to move up and down through the sleeve 460, when the elevating mechanism 80 is operated, as controlled by the movement of the helically threaded lift rod 543, as seen in FIG. 1.

Referring again to FIGS. 1 and 2 of the drawings, integrally affixed to the lower frontal portion of the vertical support beam 90 on the base support member 40 is the lower lift support plate 550. In particular, the lower lift support plate 550 is basically a rectangularly shaped plate member having a flat upper surface. It is noted that the lower lift support plate 550 may be other than rectangular in shape, as viewed from an upper elevational view, and may have in some circumstances, an upper surface that is not flat. Moreover, the lower surface of the lower lift support plate 550 may be other than flat. The lower lift support plate 550 has a posterior edge 103 and a frontal edge 104. The posterior portion of the upper surface of the lower lift support plate 550 is affixed to the extreme bottom end of the vertical support beam 90, as seen in the drawings. More directly, in the preferred embodiment, the bottom portion 92 of the vertical support beam 90 is welded or otherwise affixed directly to the upper surface of the lower lift support member 550 so that a portion of the upper surface of the lower lift support plate 550 extends under the complete lower surface portion of the vertical support beam 90, as seen in FIG. 1.

In a corresponding and similar manner, an upper lift support member 400 is affixed to the upper portion of the base support member 40, as seen in FIG. 1. The upper lift support member 400 is preferably shaped identically to the lower lift support member 550, although this aspect is not essential. As in the case of the lower lift support member, the upper lift support member 400 has an upper surface 410 and a lower surface 420, with the lower surface facing toward the upper surface of the lower lift support member 550. A portion of the lower surface 420 of the upper lift support member 400 is affixed in a flush manner to the upper end of the elevating mechanism 80 and the upper surface portion of the vertical support beam 90.

As seen, the elevating mechanism 80 is integrally disposed between the upper lift support member 400 and the lower lift support member 550, as seen in the drawings. The elevating member 80 is comprised, in part, generally of a longitudinally and vertically extending lift bar 543 which has an upper end 11A and a lower end 11B. The upper end 11A of the lift bar 11A is rotatably mounted in the upper lift support plate member 400, as well as in the lower lift support plate member 550, as seen in the drawings. In the preferred embodiment of the subject invention, the respective upper and lower ends 520 and 530 of the upright lift support member 510 are affixed generally to the frontal portions of the upper surface and lower surface respectively of the horizontal lift support plates 400 and 550 respectively, although this feature is not critical, so long as there is room remaining on the respective lift support plates for attachment of the vertical threaded lift bar 543.

In the preferred embodiment of the subject invention, the vertical lift support bar member and the threaded lift bar 543 are disposed vertically parallel to one another as shown in FIG. 1, with the threaded lift bar being positioned just posterior to the vertical support bar. As further seen, the sleeve member 460 has a posterior extension member 555 that is fixed in position relative to the sleeve member 460. The posterior extension member 555 is essentially an additional sleeve member which surrounds peripherally a portion of the vertical lift bar 543. Specifically formed inside the posterior extension member 555 is an internal bore, not shown, which is threaded appropriately to mate with a portion of the external helical threads on the lift bar member 543. As the hand crank member 540 is manipulated in a clockwise or counterclockwise manner, the threaded lift bar 543 will be rotated accordingly and as the lift bar rotates the threaded members on the lift bar will turn in a helical pattern and thereby cause the lift bar member to move up and down through the threaded bore of extension member 555 to sleeve 460, and the vertical lift bar 543 will move up and down by the amount of a rotation of handle member 540. The lift bar 523, by its movement, will cause life support member 510 to move up and down in sleeve 460, and thus cause the entire base support member 40 to move up and down as will. The net effect will be to move the horizontal wheel carrying member 75 up and down as needed for loading and transportation of the towed vehicle.

In the preferred embodiment of the subject invention, the vertical lift support member 510 is rectangular in cross-sectional configuration, as seen from an upper or lower view thereof. Again, this rectangular feature is not critical to the subject invention as the exterior perimeter surface, in section, may be circular, elliptical or other configuration, so long as the vertical lift support member 510 is structurally adapted to move vertically a substantially conforming sleeve member, such as sleeve member 460 shown in FIGS. 1 and 2. This sleeve member 460 is adapted to fit around any peripheral portion of the outer surface of the vertical lift support member 510 and slidably engage same so that the vertical lift support member 510 can move up and down through the sleeve 460, as discussed.

As stated, the threaded lift bar 523 is a longitudinally extending vertical upright member having a first end 11A and a second end 11B. The external cylindrically shaped lift bar 523 in the preferred embodiment is threaded in a helical manner over its entire outer surface with a continuous inclined screw pattern from its end 11A to its second end 11B. As indicated, the threaded lift bar 523 is rotatably mounted in the upper horizontal and lower lift support plate members 400 and 550. The threaded lift bar 523 is rotatably mounted in the respective support plates so as to be rotatable within and relative to such plates. More particularly, the upper end of the lift bar 523 is mounted within a thrust bearing extending from the lower surface of support plate 400 through to the upper surface thereof. Correspondingly, the lower end of the lift bar 523 is rotatably mounted in lower support plate 550. Moreover, there is sufficient clearance of the upper end 11A of the threaded lift bar 523 above the upper surface 410 of upper lift support plate 400 to receive the inner torque end 580 of a winch handle 540. As seen, in this latter respect, the torque end 580, or inner end of a winch handle 540, is concentrically and fixedly mounted to a circumferential portion of the upper end 11A of the threaded lift bar 523 that extends up above the upper surface of the upper lift support plate 400 as seen. Moreover, as seen in the drawings, a locking nut 590 is concentrically mounted to the extreme upper end of the threaded lift bar 23 to secure the torque end 580 of the winch handle 540 on the lifting rod 523.

Variant embodiments of the subject invention may additionally include a motorized or other automatic electric-mechanical means affixed to a portion of the threaded lift bar 523 in order to eliminate manual movement of a grasping device, such as the winch, not shown. Other means may be used to rotate the lift rod 523.

As stated, sleeve member 460 has an inner hollow chamber open at both the upper and lower ends of such sleeve member so that the internal hollow chamber extends completely through the sleeve member. For this purpose, the internal chamber of the sleeve member 460 is preferably, but not necessarily of an internal surface configuration that is the same configuration as the outer external perimeter or circumferential surface of the lift support member 510. In the preferred embodiment, this configuration is rectangular as seen from an upper or lower elevational view to be compatible with the rectangular configuration of the outer surface of the lift support member 510. However, the perimeter dimension will be just a slightly larger perimeter dimension than that of the external surface of the lift support member. This latter size relationship will enable lift support member 510 to move up and down with relative ease as controlled by the movement of the lift rod 523.

Attention is addressed to FIGS. 1 and 2 of the drawings which show the wheel support member 75 that is affixed in L-shaped fashion projecting rearwardly from the lower portion of the vertical support member 90. The wheel support platform member 75 is the lower leg of the L-shaped support member 40. As seen, the wheel support member 75 has opposing upwardly extending longitudinally extending flanged members 95A and 95B, which form in part vertical portions of the longitudinally extending wheel carrying member 75 into which the forward wheel 225 of the motorcycle is placed to be held and secured for carrying purposes. As seen, the wheel support member 75 in the preferred embodiment has opposing diagonal support member 740A and 740B, each affixed to the forward of the longitudinally extending flanges 95A and 95B, which extend upwardly and frontally in a diagonal manner to a medial portion of the vertical support member 90 as seen in FIGS. 1 and 2. In this respect, the exact angled relationship of the diagonal support members 740A and 740B on the wheel carrying member 75 may vary. These diagonal support members render additional support for the wheel carrying member 75 as affixed to the lower part of the base support member 40, as seen.

Moreover, the diagonal support members 740A and 740B provide additional lateral support for the front wheel 225 of the motorcycle so that it will not move or sway laterally from side to side when the front wheel 225 is secured in the wheel platform 70, as seen.

Additionally, as seen in the drawings, the subject apparatus has laterally extending arms 15A and 15B, each extending laterally in a perpendicular direction relative to the longitudinally extending axis of the wheel support member 75. More particularly, the lateral arms 15A and 15B are affixed on their respective inner ends to the opposing outer surfaces of the flanged member 95A and 95B, as seen, for the wheel support member 75.

As such as seen in the embodiment shown in FIGS. 1 and 2, the opposing horizontal flanged members 95A and 95B that are affixed to the vertical support member 40, extends rearwardly or in a posterior direction away from the motor vehicle. These flanged plates 95A and 95B provide yet additional lateral support for the upright front motorcycle wheel 225 when placed in the wheel support member 75, as represented in the drawings.

As seen when the front wheel 225 of the motorcycle 200 is placed in the wheel support member 75, the wheel and motorcycle can be further secured in position by guy ropes or wire extending from fastening means on each end of the lateral arms 15A and 15B, extending up to a portion of the motorcycle. These guy ropes or wires can be affixed after the front motorcycle wheel 225 is rolled into place. Once the motorcycle front wheel 225 is in its place, it is secured as stated, and then the elevating mechanism is used to raise the base support member 40 upwardly with the activation of the lifting mechanism 80. This raises the front end of the motorcycle 200 for transporting purposes.

In summary the subject invention is a carrier for a motorcycle having two wheels in tandem for attachment to a posterior portion of a motor vehicle comprising a base support member, such base support member having a frontal posterior and a posterior portion, such base support member being adapted to be disposed in an upright position, such base support member having a bottom end and a top end, with the frontal portion of such base support member being adapted to be affixed to the posterior portion of a motor vehicle, and further elevating means affixed to the base support member, such elevating means being adapted to elevate or lower the base support member relative to the position of the motor vehicle, with wheel support means affixed to the posterior portion of the base support member, such wheel support member being adapted to hold one wheel of the motorcycle or other vehicle.

What is claimed is:

1. A carrier for a motorcycle having two wheels in tandem, said carrier adapted for attachment to a posterior portion of a motor vehicle said carrier comprising, (a) an upright longitudinally extending base support member, said base support member having a frontal portion and a posterior portion, said base support member adapted to be disposed in an upright position, said base support member having a bottom end and a top end, horizontally disposed wheel carrying member affixed adjacent to the lower end of the posterior portion of said base support member and disposed in a posterior direction, said wheel carrying member being formed with a channeled upper surface over its longitudinal extent, said wheel carrying member adapted to hold in an upright position one wheel of said motorcycle, said base support member having an upper lift support plate and a lower lift support plate;

(b) an attachment member adapted to be affixed to a posterior portion of said motor vehicle, said attachment member having a substantially vertically extending rigid member that has a vertically disposed sleeve member connected and affixed rigidly on the posterior portion of said attachment member with said sleeve member having an internal hollow cylindrically shaped chamber with a helically threaded inner surface on the interior surface of said hollow chamber;

(c) vertical lift means affixed vertically in a position between the upper lift support plate and the lower lift support plate, and adjacent to and forward of said upright base support member, said vertical lift means comprising a vertical cylindrical bar member having helically threaded members formed on the exterior surface thereof, said helically threaded members being adapted to engage matingly the helically threaded inner surface of the interior cylindrical surface of said sleeve member;

(d) a pair of opposing support members each extending diagonally from said wheel support member to a portion of said upright base support member;

(e) a pair of laterally extended support arms, each affixed on their respective inner ends to an opposing outer surface on said wheel support member, each of said laterally extended support arms extending laterally in a perpendicular direction relative to the longitudinal central axis of the wheel support member;

(f) elevating means affixed to the vertical lift means to move said vertical lift means up and down in said sleeve member affixed to said connecting member.

2. A carrier for a motorcycle having two wheels in tandem, said carrier adapted for attachment to a posterior portion of a motor vehicle, said carrier comprsing:

(a) an upright longitudinally extending base support member, said base member having a frontal portion and a posterior portion, said base member adapted to be disposed in an upright position, said base support member having a bottom end and a top end, said base support member having a horizontally disposed wheel carrying member affixed adjacent to the lower end of the posterior portion of said base support member and disposed longitudinally in a posterior direction from said base support member, said wheel carrying member being formed with a channeled upper surface over its longitudinal extent, said wheel carrying member adapted to hold in an upright position one wheel of said motorcycle within said channeled upper surface of said wheel support member, said base support member having an upper lift support plate and a lower lift support plate;

(b) A lift attachment member adapted to be affixed to a posterior portion of said motor vehicle, said lift attachment member having a substantially vertically extending rigid member that has a vertically disposed sleeve member connected and affixed rigidly on the posterior portion of said lift attachment member, said sleeve member having an internal hollow cylindrically shaped chamber with a helically threaded inner surface on the interior surface in said hollow chamber;

(c) vertical lift means affixed vertically in a position between the upper lift support plate and the lower lift support plate, and adjacent to and on the frontal portion of said base support member, said vertical lift means comprising a vertical cylindrical bar member having helically threaded members formed on the exterior surface thereof, said helically threaded members being adapted to engage matingly the helically threaded inner surface on the interior cylindrically shaped chamber in said sleeve member;

(d) a pair of opposing support members each extending diagonally upwardly from said wheel support member to a portion of said base support member;

(e) a pair of laterally extending support arms, each affixed on their respective inner ends to an opposing outer surfaces on said wheel support member, each of said laterally extending support arms extending laterally in a perpendicular direction relative to the opposing outer surfaces of said wheel support member.

* * * * *